Dec. 30, 1930. L. G. COPEMAN 1,786,827
METHOD AND APPARATUS FOR POSITIONING AND SEALING
ICE CREAM CANS IN ICE CREAM CABINETS
Filed Dec. 10, 1928
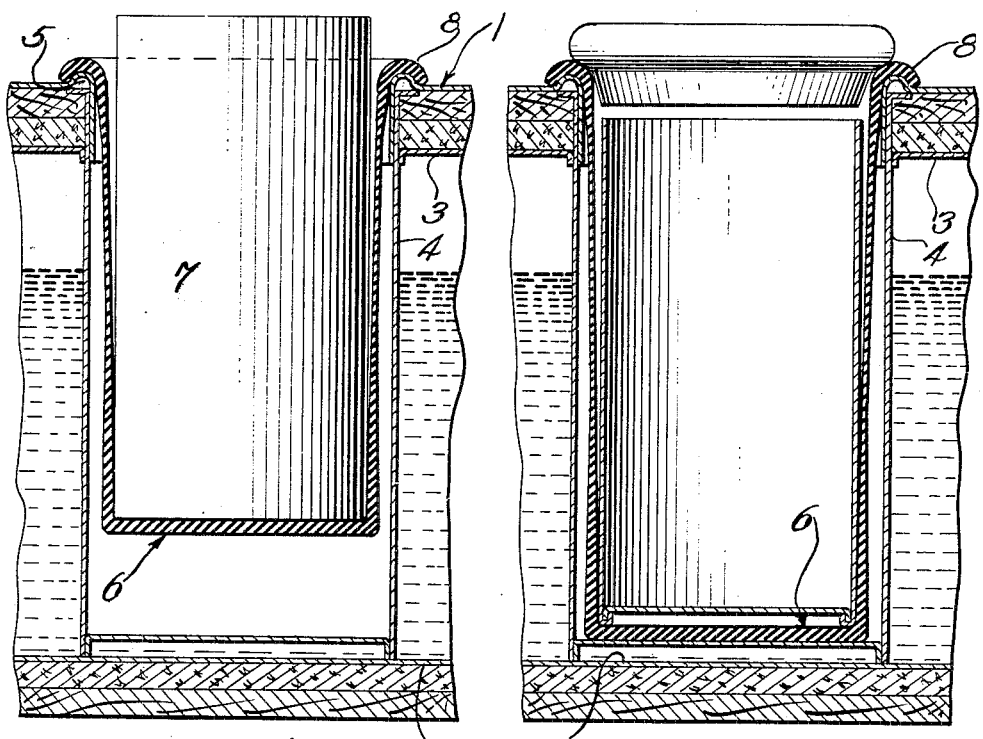
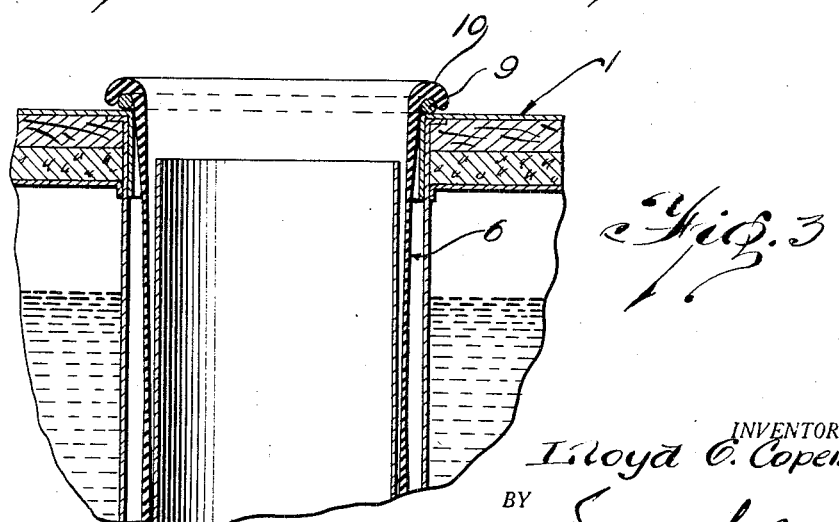
INVENTOR.
Lloyd G. Copeman
BY
Stuart C. Barnes
ATTORNEY.

Patented Dec. 30, 1930

1,786,827

UNITED STATES PATENT OFFICE

LLOYD G. COPEMAN, OF FLINT, MICHIGAN, ASSIGNOR TO COPEMAN LABORATORIES COMPANY, OF FLINT, MICHIGAN, A CORPORATION OF MICHIGAN

METHOD AND APPARATUS FOR POSITIONING AND SEALING ICE-CREAM CANS IN ICE-CREAM CABINETS

Application filed December 10, 1928. Serial No. 324,830. REISSUED

This invention relates to a method and apparatus for positioning and sealing ice cream cans in ice cream cabinets, and has to do particularly with a novel method and apparatus for inserting ice cream cans within the ice cream container of the ice cream cabinet, and also with the novel method of maintaining the can completely separate from and in air tight relation to its container.

Heretofore, it has been the general practice to insert the ice cream can directly in the container with the result that the brine which usually adheres to the can remains in the space between the ice cream can and the container which makes the old assembly very unsanitary. Furthermore, during the dispensing of the ice cream, ice cream and other particles and substances are dropped in this space between the can and the container which further adds to the unsanitary assembly. In addition to this disadvantage, much difficulty is often encountered in the formation of ice between the walls of the container and the ice cream can, with the result that it is often impossible to remove the ice cream can without considerable difficulty.

As fully set forth in my prior application, Serial No. 166,906, filed February 9, 1927, I have heretofore provided paper receptacles positioned between the ice cream can and the container whereby to separate and seal the container walls from the ice cream can. However, these paper receptacles are objectionable in that they are quite bulky and take up a large amount of space both in transportation and storage. Furthermore, such paper receptacles are relatively expensive as a new one is required with each replacement of an ice cream can.

It is the object of the present invention to provide means which will completely separate the can and the container and also seal the container from the can, such means being of such material as to make possible its use for a long period of time. More specifically, I have provided a receptacle of elastic material, preferably rubber, which is preferably of shorter length than the ice cream can and which is adapted to be assembled in the ice cream cabinet in a novel manner.

This novel method of assembly is accomplished by first fitting the rubber receptacle about the lower end of the ice cream can and then picking up the rubber receptacle and the can and placing the same in the desired container of the ice cream cabinet. As the can sinks to the bottom of the container the flexible walls of the receptacle will, of course, be stretched until the can and receptacle strike the bottom of the container. The top of the receptacle being flanged will contact with the annular opening of the container and stretching of this receptacle will obviously increase the pressure between the annular ring at the top and the container whereby to provide a positively sealed joint. The sealing of the outer container from the atmosphere and from the ice cream can will prevent the formation of any ice on the container or the ice cream can. Furthermore, the positioning of the rubber receptacle will positively prevent the dropping of any foreign material or ice cream into the space between the receptacle and the container. The rubber receptacle may be, of course, very easily removed from the ice cream can, and after being used the same may be washed or sterilized and then placed in a new can to be inserted into its proper container.

In the drawings:

Fig. 1 is a vertical sectional view illustrating the step of placing the ice cream can and rubber receptacle into a container.

Fig. 2 illustrates the second step of this process wherein the weight of the can has stretched the rubber receptacle until it touches the bottom of the container.

Fig. 3 is an enlarged sectional view similar to Fig. 2 but being slightly modified in that it includes a reinforcing arrangement adjacent the upper edge of the rubber receptacle.

The present invention may be used in connection with any standard type of ice cream cabinet, and in illustrating the present invention I have shown the same as embodied in an ice cream cabinet of the type utilizing brine as the conducting medium. Any suitable refrigerating apparatus may be utilized in cooling the brine.

The ice cream cabinet may be generally designated 1 and is preferably built up in the usual manner to provide an outside frame and a brine tank 2 for receiving the brine and the refrigerating medium. The top 3 of the brine tank is preferably apertured to receive one or more storage containers 4, for receiving the ice cream cans. The top of the ice cream cabinet is preferably so fabricated as to provide an annular beading or ring 5.

As best shown in Fig. 1 I preferably provide a rubber or other flexible cylindrical receptacle 5 which normally is preferably of less length than the height of the ice cream can 7. The top part of the rubber receptacle 5 is preferably so molded as to provide a relatively heavy annular flange portion 8 which may or may not be reinforced, according to the tension to be placed upon the same.

By making the rubber receptacle 5 of less height than the ice cream can 7 it will be obvious that such receptacle 6 will stretch as the ice cream can is lowered into position. This placing under tension of the rubber receptacle and the stretching of the same will obviously increase the pressure of the annular flange 8 upon the ring 5 so as to present a very rigid, air tight joint.

In operation, the rubber receptacle 6 is preferably placed upon the ice cream can before the same is inserted in the container. After the insertion of the rubber receptacle over the outside of the can, the two assembled parts may then be lowered into the container so that they assume the position as shown in Fig. 1. Releasing of the ice cream can will permit the same to lower by gravity until it strikes the bottom of the container at which time the sides of the rubber receptacle will be stretched, as best shown in Fig. 2.

The rubber receptacle 6 will obviously seal the container 4 from the inner ice cream can 7 so that the air is shut off from the space between the rubber receptacle and the container, and thus will prevent condensation and freezing of any moisture. Any freezing of what moisture might be entrapped in the sealed space will have no effect on the present arrangement because the rubber receptacle will not adhere to the ice and may be easily and quickly removed, regardless of any freezing that might take place adjacent the container walls. Furthermore, any foreign substances or ice cream that is dropped around the outside of the ice cream can will be caught by the rubber receptacle and will be prevented from accumulating in the container. When the ice cream can is removed, the rubber receptacle is preferably removed with the same, and is then stripped from the ice cream can when it may be washed and sterilized and/or placed upon a new ice cream can for insertion in the cabinet.

A slightly modified form of applicant's device is shown in Fig. 3 wherein a reinforcing ring 9 is provided in addition to the heavy annular flange 10 of the receptacle 6. Obviously the reinforcing ring 9 may be positioned as shown, or directly embedded in the outwardly extending flange of the receptacle. This latter will be particularly adaptable for use with ice cream cans of the larger type containing a relatively large supply of ice cream.

It will thus be obvious that I have provided a novel receptacle formed of such material that it permits the same to be cleansed and sterilized and used for an indefinite length of time. It will furthermore be obvious that such receptacle being preferably formed of rubber will be very easily and readily removed regardless of any freezing action that may take place.

It will be understood that in using the word "receptacle" in the specification and claims that such term should be given the broad meaning of means for receiving the ice cream can, and is not limited to any particular shape or container because of such term.

What I claim is:

1. An ice cream cabinet comprising one or more containers adapted to receive ice cream cans or similar articles having a flexible receptacle normally of less length than the ice cream can and adapted to contact with the upper edge of the container whereby the ice cream can when postioned in its lowermost position will tend to place said receptacle under tension.

2. An ice cream cabinet consisting of one or more containers adapted to receive ice cream cans or similar articles and a rubber sleeve for receiving an ice cream can, the upper end of said rubber sleeve being of such shape as to inherently maintain a sealing relation with the outer container and the lower end of said sleeve contacting with said can whereby to exclude outside air from coming in contact with the inner walls of the container.

3. An ice cream cabinet consisting of one or more containers adapted to receive ice cream cans or similar articles and a flexible sleeve of less length than the ice cream can and adapted to be fitted around the ice cream can before insertion of the same in its container, the upper edge of said sleeve being provided with an annular outwardly extending flange adapted to contact with the upper edge of the cabinet whereby the same will be placed under tension as the ice cream can is lowered into its lowermost position.

4. An ice cream cabinet, comprising one or more containers adapted to receive ice cream cans or similar articles, and a sleeve formed of rubber of less length than the ice cream can for receiving the ice cream can and separating the same from the outer container, the upper edge of said rubber sleeve being provided with an annular outwardly extending flange so shaped as to be inherently held in sealing relation with the top of the container when the ice cream can is in position.

5. An ice cream cabinet, comprising an outer container adapted to receive an ice cream can or similar article and a sleeve for excluding the outside air from coming in contact with the inner walls of said container, said sleeve having an outwardly flaring portion adapted to be positioned in sealing relation with the upper end of said container, the inner annular end of said sleeve being formed of flexible material which contacts with said ice cream can in sealing relation when the can is inserted in position in the container.

6. An ice cream cabinet of the type having an outer container and an inner container in the form of an ice cream can or similar article, comprising a sealing sleeve of less length than said ice cream can, the upper and outer end of said sleeve being so shaped and positioned as to be in substantially sealing relation with the upper portion of said outer container, the inner lower portion of said sleeve being formed of flexible material contacting in substantially sealing relation with the ice cream can whereby to exclude outside air from coming in contact with the inner walls of the outer container.

In testimony whereof I affix my signature.

LLOYD G. COPEMAN.